United States Patent

Altermatt

[11] 4,013,636
[45] Mar. 22, 1977

[54] N,N-DIETHYL-4-(2,4-DINITRO-6-ALKYL-SULFONYLPHENYLAZO)-2-ALKOXY-5-ALKYL-CARBONYLAMINOANILINES

[75] Inventor: Ruedi Altermatt, Buckten, Switzerland

[73] Assignee: Sandoz Ltd., Basel, Switzerland

[22] Filed: Dec. 17, 1974

[21] Appl. No.: 533,522

[30] Foreign Application Priority Data

Dec. 21, 1973 Switzerland .................... 18039/73

[52] U.S. Cl. .................................. 260/207; 260/208; 260/562 N; 260/574; 260/578

[51] Int. Cl.$^2$ .................. C09B 29/26; D06P 3/26; D06P 3/42; D06P 3/54

[58] Field of Search .................................. 260/207

[56] References Cited

UNITED STATES PATENTS

| | | | |
|---|---|---|---|
| 2,111,300 | 3/1938 | Senn | 260/207 X |
| 2,941,992 | 6/1960 | Rhyner et al. | 260/205 |
| 3,503,955 | 3/1970 | Genta | 260/207 |
| 3,627,752 | 12/1971 | Cornelius et al. | 260/205 |
| 3,637,651 | 1/1972 | Baron et al. | 260/207 |
| 3,692,769 | 9/1972 | Weaver et al. | 260/207.1 |
| 3,845,034 | 10/1974 | Brachel et al. | 260/205 |
| 3,883,504 | 5/1975 | Schickfluss et al. | 260/207.1 |

FOREIGN PATENTS OR APPLICATIONS

| | | | |
|---|---|---|---|
| 2,140,548 | 1/1973 | France | 260/207 |
| 1,809,920 | 6/1970 | Germany | 260/207 |

*Primary Examiner*—Daniel E. Wyman
*Assistant Examiner*—John J. Doll
*Attorney, Agent, or Firm*—Gerald D. Sharkin; Richard E. Vila; Melvyn M. Kassenoff

[57] ABSTRACT

Monoazo compounds of the formula

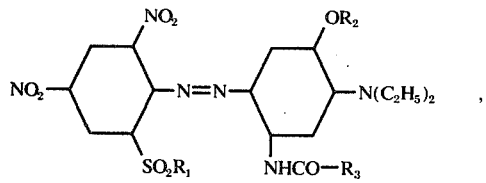

in which each of $R_1$, $R_2$ and $R_3$, which may be the same or different, signifies a methyl or ethyl radical, which are useful as disperse dyes for substrates comprising or consisting of synthetic or semi-synthetic hydrophobic high molecular weight polymers, e.g., linear aromatic polyesters, cellulose acetates and synthetic polyamides. The dyeings exhibit notable fastness to light, heat treatments, wet treatments, perspiration, solvents, lubricants, rubbing, cross-dyeing, ozone, flue gas and chlorine and resistance to permanent pressing, soil release finishes and reduction.

7 Claims, No Drawings

N,N-DIETHYL-4-(2,4-DINITRO-6-ALKYLSUL-FONYLPHENYLAZO)-2-ALKOXY-5-ALKYL-CAR-BONYLAMINOANILINES

The present invention relates to monoazo dyes, their production and use.

More particularly, the present invention provides compounds of formula I,

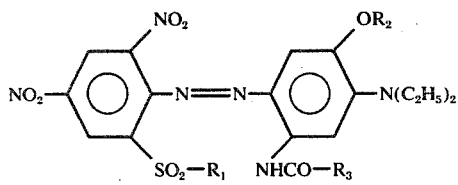

in which each of $R_1$, $R_2$ and $R_3$, which may be the same or different, signifies a methyl or ethyl radical.

In the compounds of formula I, $R_1$ preferably signifies a methyl radical. $R_2$ preferably signifies an ethyl radical. $R_3$ preferably signifies a methyl radical.

Thus, a preferred dye of formula I is

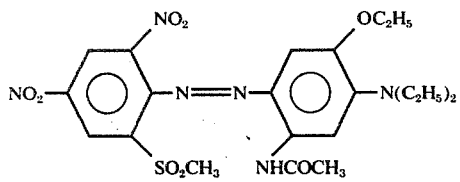

The present invention also provides a process for the production of compounds of formula I, as defined above, comprising a. condensing a compound of formula II,

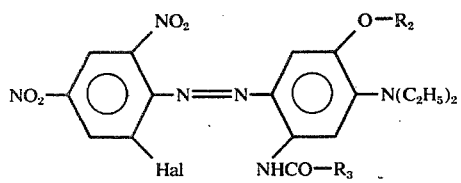

in which
$R_2$ and $R_3$ are as defined above, and
Hal signifies chlorine or bromine,
with a compound of formula III,

in which
$R_1$ is as defined above, and
X signifies a hydrogen atom or a metal equivalent, preferably in a 1 : 1 molar ratio, or b. coupling the diazotization product derived from an amine of formula IV,

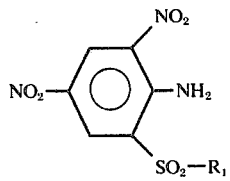

in which $R_1$ is as defined above, with a compound of formula V,

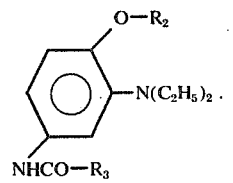

in which $R_2$ and $R_3$ are as defined above,

Process (a) is preferably carried out in an aprotic solvent such as dimethylformamide, dimethylacetamide, dimethylsulphoxide, dimethylsulphone, phosphoric acid tris-dimethylamide, pyridine or quinoline, or in a mixture of any of these solvents with water. The reaction temperature is conveniently between 0° and 200° C, preferably between 20° and 100° C. Furthermore, the reaction is preferably carried out in the presence of a copper (I) salt or metallic copper powder. Completion of the reaction may be determined by standard methods, such as thinlayer chromatographic analyses. In the compounds of formula III, X is preferably a sodium or potassium ion or an equivalent of zinc ion.

The coupling reaction in process (b) may be carried out in accordance with known methods. Suitably, coupling is effected in an acidic, preferably buffered, medium, e.g. with a pH value of less than 5. The reaction is effected with cooling, suitable temperatures being less than 20° C, preferably between −5° and +5° C. Examples of suitable buffers are alkali metal salts of lower alkanoic acids such as acetic acid and propionic acid. Sodium acetate is a preferred buffer.

Diazotization of the amine of formula IV, as defined above, may be carried out in accordance with known methods.

The compounds of formula I, as defined above are useful as dyes.

Thus, the present invention still further provides a process for exhaust dyeing, pad dyeing or printing substrates consisting of or comprising synthetic or semi-synthetic, hydrophobic organic substances. As examples of suitable substrates may be given substrates consisting of or comprising linear, aromatic polyesters, cellulose 2½ acetate, cellulose triacetate and synthetic polyamides. The substrate may be in loose fibre, yarn or fabric form.

The compounds of formula I may be converted into dyeing preparations in known manner, for example, by grinding in the presence of dispersing agents and/or fillers, with subsequent spray or vacuum drying. The preparations may be employed in conventional manner for pad dyeing, exhaust dyeing or printing in a long or short bath. For example, they may be employed in a manner as described in French Pat. 1,445,371.

The dyeings obtained have notable fastness properties in particular fastness to light, thermosetting, sublimation and pleating. The dyeings also show notable fastness to water, sea-water, washing, perspiration, solvents, lubricants, rubbing, cross-dyeing, ozone, flue gas and chlorine. The dyeings obtained also show resistance to permanent pressing, soil release finishes and reduction and they reserve wool and cotton.

The following Examples further serve to illustrate the present invention. In the Examples all parts and percentages are by weight and all temperatures are in degrees Centigrade.

EXAMPLE 1

6.9 Parts sodium nitrite powder are added to 120 parts concentrated sulphuric acid at 60° to 70° with vigorous stirring. Stirring is continued for a further 10 minutes at 60° and the temperature is then reduced to 10°. 100 parts glacial acetic acid, followed by 26.1 parts 2-amino-3,5-dinitro-1-methylsulfonylbenzene and 100 parts glacial acetic acid are added at 10° to 15°. The mixture is stirred for 3 to 5 hours at 10° – 15° and the diazonium salt solution obtained is poured into a mixture consisting of 25 parts 4-ethoxy-3-N,N-diethylamino-1-acetylaminobenzene, 200 parts glacial acetic acid, 10 parts aminosulphonic acid and 200 parts ice. Coupling is completed in an acid medium by the addition of sodium acetate to give a pH of 2.0 – 2.5. The dye forms immediately and forms a precipitate. It is filtered off, washed until free from acid and dried. The dyestuff dyes synthetic fibres in greenish-blue shades and the dyeings have good fastness properties.

EXAMPLE 2

18 Parts of an aqueous solution (30%) of methane sulphinic acid, sodium salt, and 5.2 parts of copper(1)-chloride are added at 20° – 25° to a solution of 26 parts 2-bromo-4,6-dinitro-2'-acetylamino-4'-N,N-diethylamino-5'-methoxy-1,1'-azobenzene in 300 parts dimethylformamide. The mixture is heated to 65° and stirred for 1 hour, after which it is cooled to 25° and diluted with 500 parts methanol. The precipitated dye is filtered off, washed with methanol and dried. It dyes synthetic fibres in greenish-blue shades and the dyeings have good fastness properties.

EXAMPLE 3

26.1 Parts 2-amino-3,5-dinitro-1-methylsulfonylbenzene are diazotised as in Example 1. The diazonium salt solution obtained is cooled to 5° C and mixed slowly with a solution of 26.4 parts 4-ethoxy-3-N,N-diethylamino-1-propionylaminobenzene in 200 parts glacial acetic acid. The resultant mixture is slowly poured on to a mixture of 500 parts ice and 500 parts water. The dyestuff forms immediately and precipitates. It is filtered off, washed until free of acid and dried. The dye obtained dyes synthetic fibres in greenish-blue shades and the dyeings have good fastness properties.

The following Table shows additional dyes of formula I which can be produced in analogy to the procedure described in the preceding Examples. With all these dyes, the shade of the dyeings on polyester fibre material is greenish-blue.

TABLE

| Examples | $R_1$ | $R_2$ | $R_3$ |
| --- | --- | --- | --- |
| 4 | —CH$_3$ | —CH$_3$ | —C$_2$H$_5$ |
| 5 | —C$_2$H$_5$ | ″ | ″ |
| 6 | ″ | —C$_2$H$_5$ | ″ |
| 7 | ″ | ″ | —CH$_3$ |
| 8 | ″ | —CH$_3$ | ″ |

APPLICATION EXAMPLE A

7 Parts of the dye produced according to Example 1 together with 4 parts dinaphthyl methane disulphonic acid sodium, 4 parts sodium cetyl sulphate and 5 parts anhydrous sodium sulphate are ground in a ball mill for 48 hours to give a fine powder.

1 Part of the dye preparation so obtained is made into a paste with a little water and the resultant suspension is passed through a sieve into a dyebath containing 2 parts sodium lauryl sulphate in 4000 parts water. The liquor ratio is 1:40. 100 Parts scoured polyester fabric is then added to the bath at 40° – 50°, followed by 20 parts of a chlorinated benzene emulsified in water, the bath is heated slowly to 100° and dyeing is carried out for 1 – 2 hours at 95° – 100°. The greenish-blue dyed fabric is washed, soaped, washed again and dried. The dyeing is level, has good depth of colour and has notable fastness properties.

APPLICATION EXAMPLE B

30 Parts of the dye produced according to Example 1, 40 parts dinaphthyl methane disulphonic acid sodium, 50 parts sodium cetyl sulphate and 50 parts anhydrous sodium sulphate are ground in a ball mill to give a fine powder.

100 Parts purified polyester fibre material are added to 4 parts of the dye preparation obtained above in 1000 parts water at 40° – 50° and the bath is heated slowly. Dyeing is carried out for approximately 60 minutes under pressure at 130°. After rinsing, soaping, rinsing and drying, a greenish-blue dyeing with the same fastness properties as the dyeing in Example A is obtained.

APPLICATION EXAMPLE C

20 Parts of the dye produced according to Example 1, 55 parts powder obtained from spent sulphite cellulose liquor and 800 parts water are ground in a ball mill until the size of the dye particles is less than 1$\mu$.

The colloid disperse solution obtained is mixed with 25 parts diethylene glycol monobutyl ether and 400 parts 6% carboxy methyl cellulose. This printing paste is very suitable for Vigoureux printing on polyester slubbing. Printing is carried out using two rollers (coverage 78%), then without intermediate drying, the material is steamed at 120°. Greenish-blue prints with good fastness properties are obtained.

What is claimed is:

1. A compound of the formula

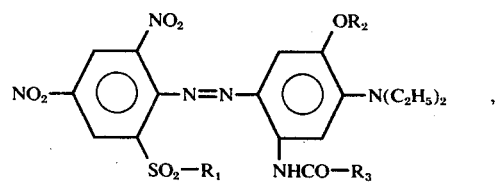

wherein each of $R_1$, $R_2$ and $R_3$ is independently methyl or ethyl.

2. A compound according to claim 1 wherein $R_1$ is methyl.
3. A compound according to claim 1 wherein $R_2$ is ethyl.
4. A compound according to claim 1 wherein $R_3$ is methyl.
5. The compound according to claim 1 having the formula
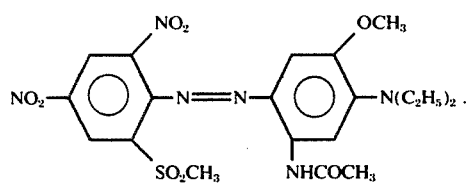
6. The compound according to claim 1 having the formula
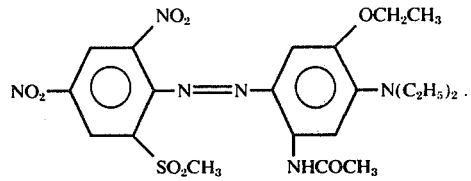
7. The compound according to claim 1 having the formula
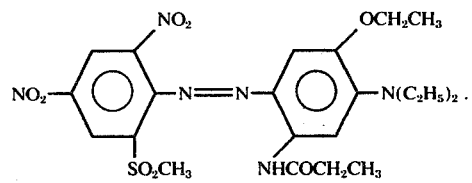
* * * * *